United States Patent [19]

Beisner et al.

[11] Patent Number: 5,251,086
[45] Date of Patent: Oct. 5, 1993

[54] TAPE DRIVE SUBASSEMBLY

[75] Inventors: W. Keith Beisner, Scotts Valley; Tom Winsemius, Soquel, both of Calif.

[73] Assignee: MPC Nakamichi Peripheral Corporation, Cypress, Calif.

[21] Appl. No.: 776,094

[22] Filed: Oct. 11, 1991

[51] Int. Cl.$^5$ .............................................. G11B 5/55
[52] U.S. Cl. ...................................... 360/106; 360/109
[58] Field of Search .................................. 360/106, 109

[56] References Cited

U.S. PATENT DOCUMENTS

| | | | |
|---|---|---|---|
| 4,646,183 | 2/1987 | Cohen | 360/109 |
| 4,747,004 | 5/1988 | Kukreja et al. | 360/106 |
| 4,750,067 | 6/1988 | Gerfast | 360/106 |
| 4,750,068 | 6/1988 | Akasaki et al. | 360/106 |
| 4,833,558 | 5/1989 | Baheri | 360/109 |
| 4,858,047 | 8/1989 | Cannon et al. | 360/106 |

Primary Examiner—Edward P. Westin
Assistant Examiner—Andrew Sanders
Attorney, Agent, or Firm—Blakely, Sokoloff, Taylor & Zafmn

[57] ABSTRACT

A tape drive with a tape head subassembly that can remotely adjust the position of the head. The drive has a baseplate that holds the cassette in place relative to the tape head. The head is operatively connected to a housing that is mounted to the baseplate by two adjustment screws. The housing also has a pivot member that allows the housing to pivot about the baseplate. The screws are located relative to the head, so that turning one of the screws rotates the housing and head such that it is parallel with the playing surface of the tape. Turning the other screw rotates the housing, such that the head is perpendicular with the length of the tape. A spring is attached to the baseplate and housing to hold the position of the head during adjustment. The spring, head and screws are positioned in a parallelogram so that adjustment of one of the screws rotates the head in only one plane.

40 Claims, 5 Drawing Sheets

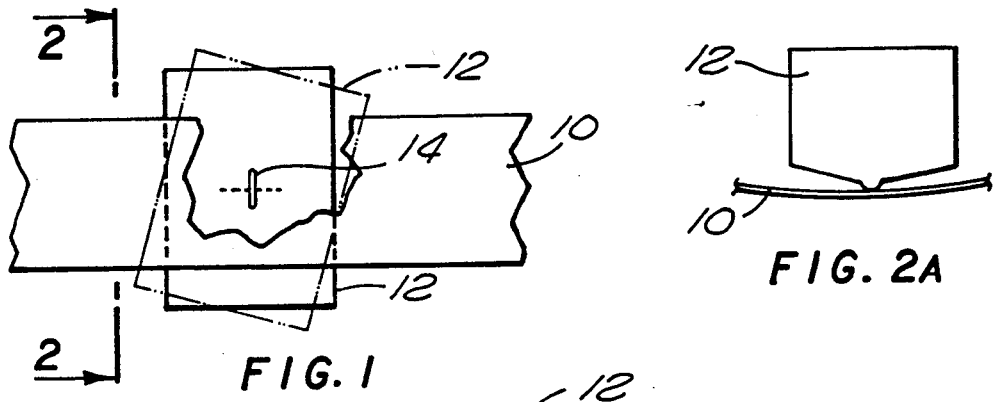
FIG. 1
FIG. 2A
FIG. 2
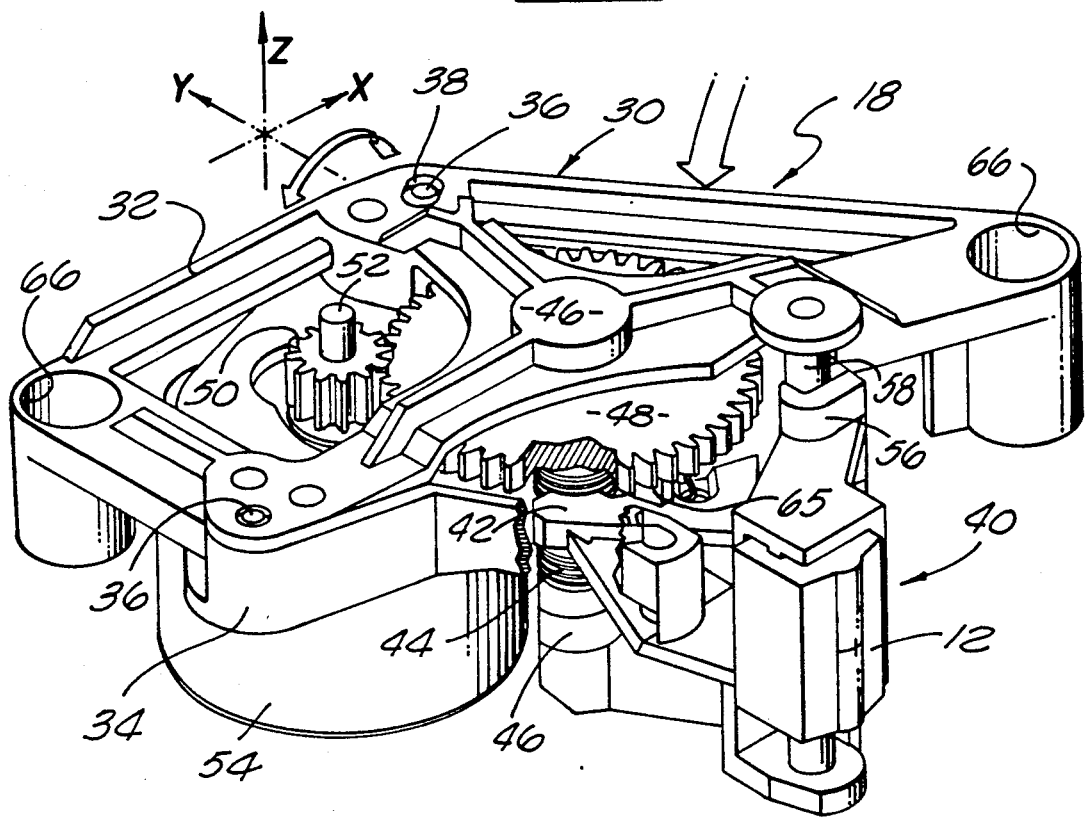
FIG. 4

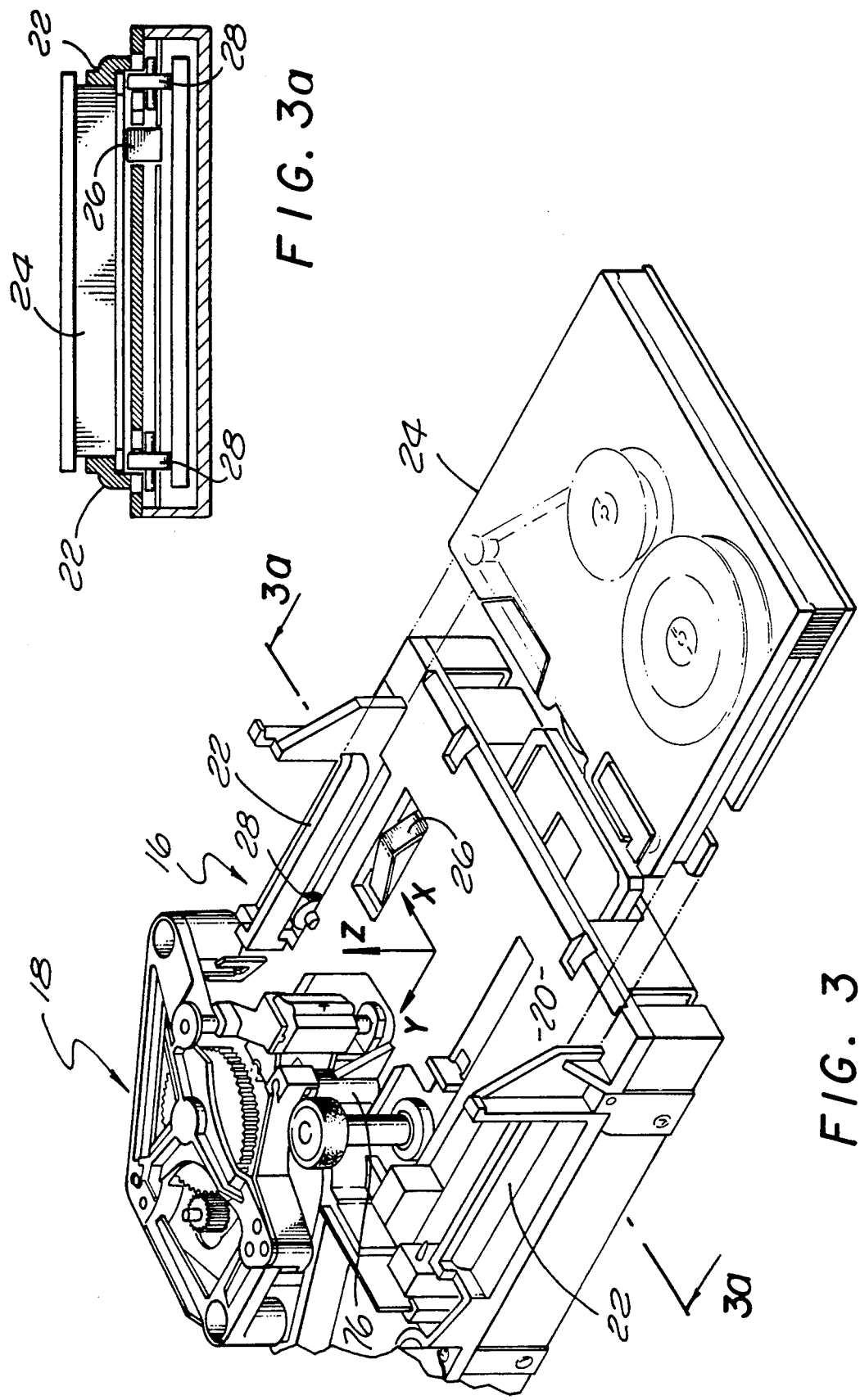

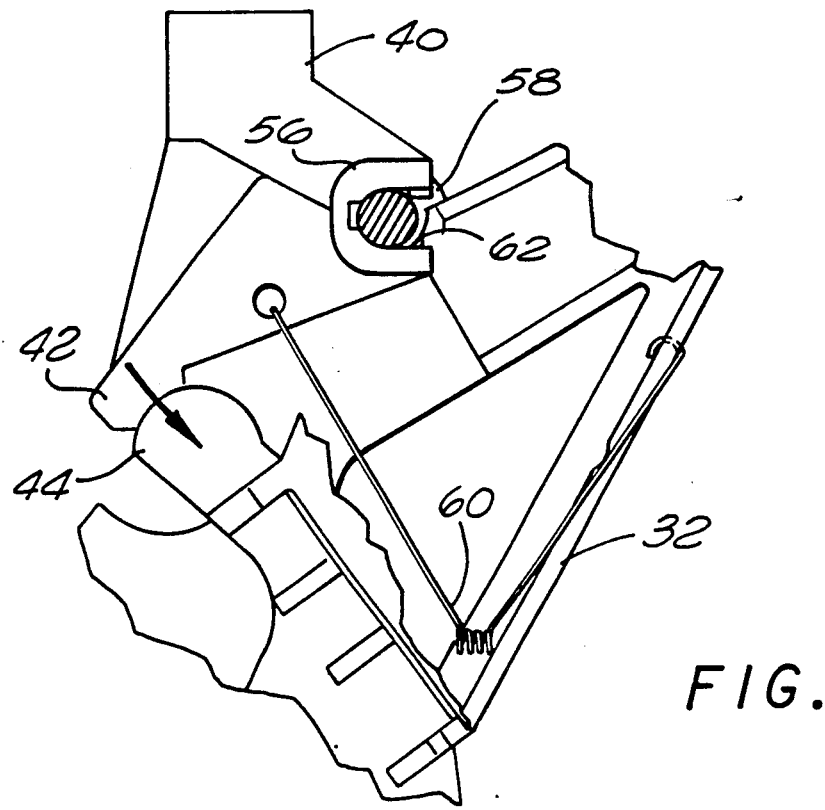
FIG. 6
FIG. 8
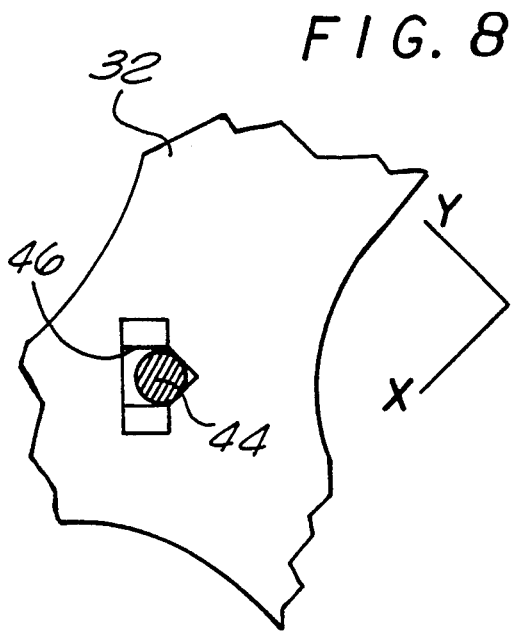
FIG. 9
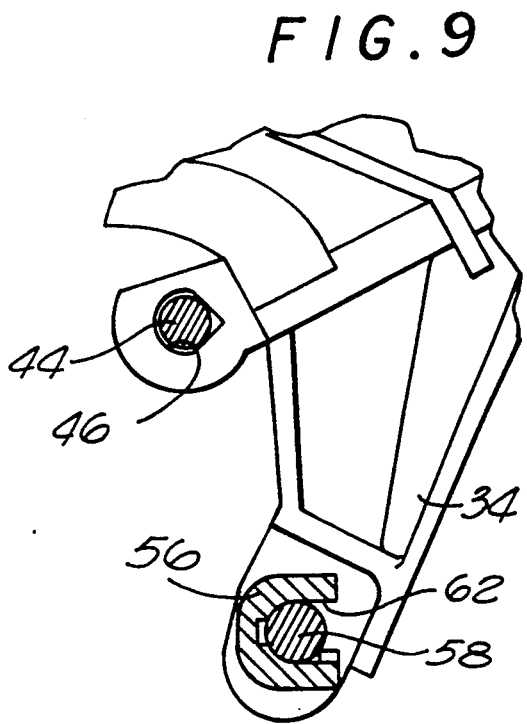

TAPE DRIVE SUBASSEMBLY

BACKGROUND OF THE INVENTION

1. Field of the Invention

This invention relates to tape drives that record and play tape cartridges.

2. Description of Related Art

Tape drives typically have a tape head that senses the varying magnetic fields in a tape as it passes before the head. It is industry standard to have the head parallel with the tape along the width of the tape, and to position the head sensor perpendicular to the length of the tape, so that a tape recorded on one tape drive can be played back on another drive unit. The accuracy of the head position is critical, wherein tolerances of 1/6 of a degree are common.

Present tape heads are attached to a tape drive housing by a pair of very fine set screws, such that the position of the head can be varied by turning the screws. To align the sensor to be perpendicular with the tape, an installation tape is played by the drive unit and the head is adjusted until a desirable reading is measured from the tape drive. To measure the parallelism of the head, a pair of dial indicators are mounted perpendicular to the base of the tape drive to measure the ends of the head. The screws are again turned until the gauge indicates that the head is parallel. The set screws are somewhat inaccessible because they are located next to the tape, making installation of the head very difficult. The screws are so small that the head must be further secured to the housing by glue. The glue must be applied before the head is positioned, which requires that the head be perfectly adjusted before the glue dries, adding a time constraint to an already difficult task. It would therefore be desirable to have a tape drive that would allow easy installation and alignment of the head.

Present tape drives have a stepper motor with a threaded output shaft that is coupled to the tape head through a head carrier. The head carrier has a threaded surface that follows the output shaft, such that the head moves along the width of the tape when the output shaft is rotated by the stepper motor. The translation of the carrier allows the head to sense different magnetic domains of the tape. The head carrier follows a guide pin that supports the carrier and insures that the head is not rotated relative to the tape when it is translated by the motor. The accuracy of the head location along the width of the tape is critical. For this reason the output shaft and the guide pin must be parallel, to insure that the rotation of the motor translates into a purely vertical movement of the head. Present designs have the output motor and guide pins supported at one end, wherein the shaft and pin can wobble during operation, causing a deviation in the desired movement of the head. To overcome this problem, prior devices incorporated an EPROM that would have a program to compensate for any deviations in the head. Such devices are expensive and require additional programming time which increases the complexity and cost of the tape drive. It would therefore be desirable to have a tape drive that provides a constant motor rotation to head translation ratio that can operate without an EPROM or other correction means.

SUMMARY OF THE INVENTION

The present invention is a tape drive with a tape head subassembly that can remotely adjust the position of the head. The drive has a baseplate that holds the cartridge in place relative to the tape head. The head is operatively connected to a housing that is mounted to the baseplate by two adjustment screws. The housing also has a pivot member that allows the housing to pivot about the baseplate. The screws are located relative to the head, so that turning one of the screws rotates the housing and head such that it is parallel with the playing surface of the tape. Turning the other screw rotates the housing, such that the head is perpendicular with the length of the tape. A spring is attached to the baseplate and housing to hold the head in position during adjustment. The screws, spring, and head are positioned in a parallelogram so that adjustment of one of the screws rotates the head in only one plane. The screws are spaced from the head so that they are completely accessible for installation.

The head is attached to a head carrier that has a threaded surface that follows a lead screw. The lead screw is coupled to a stepper motor which rotates the lead screw and moves the head relative to the width of the tape. The head carrier also has a sleeve that slides along a guide pin attached to the housing. The lead screw and guide pin are parallel to each other and have both ends supported and secured by the housing to prevent the members from wobbling and loosing parallelism. The carrier threaded surface and sleeve are pressed against the lead screw and guide pin by a spring. The sleeve has a pair of V shaped flanges that engage the guide pin, wherein the spring presses the pin into the center or wedge of the V. The V shaped flanges prevent the carrier and head from moving relative to the pin while allowing for tolerances in the manufacture and assembly of the members. Likewise the housing has a pair of V shaped sockets that hold the ends of the lead screw. The V shapes and spring force insure that the head does not float with respect to the housing and tape, improving the repeatability and overall quality of the tape drive. The present head subassembly also prevents the head from moving in a plane perpendicular to the vertical axis during the translation of the carrier, so that a constant motor rotation to head translation ratio is insured without any head deviation. The constant turn ratio eliminates the need for an EPROM or other correction means, reducing the complexity and cost of the tape drive. The head, motor and housing are all assembled as one subassembly unit that can be easily attached to the rest of the tape drive. The present drive assembly eliminates the need for glue which typically take 24 hours to dry and greatly slows down the production time of previous tape drive assemblies.

Therefore it is an object of this invention to provide a tape drive that has a tape head that can be easily adjusted during installation.

It is also an object of this invention to provide a tape drive that gives a constant motor rotation to head translation ratio.

It is also an object of this invention to provide a tape drive that prevents the head from floating.

It is also an object of this invention to provide a head subassembly which is assembled into a single unit that can be easily mounted into the rest of the tape drive.

BRIEF DESCRIPTION OF THE DRAWINGS

The objects and advantages of the present invention will become more readily apparent to those skilled in the art after reviewing the following detailed description and accompanying drawings, wherein:

FIG. 1 is a side view of a tape passing in front of a tape head showing the relative position of the head sensor to the tape;

FIG. 2 is a side view of FIG. 1;

FIG. 2a is a top view of FIG. 2;

FIG. 3 is a perspective view of a tape drive of the present invention;

FIG. 3a is a cross-sectional end view taken at line 3a—3a of FIG. 3;

FIG. 4 is a perspective view of the head subassembly of the tape drive of FIG. 3;

FIG. 6 is a cross-sectional view of FIG. 3 showing a torsional spring that connects a head carrier to the rest of the head subassembly;

FIG. 8 is a cross-sectional view of FIG. 7 taken at line 8—8;

FIG. 9 is a cross-sectional view of FIG. 7 taken at line 9—9.

DETAILED DESCRIPTION OF THE INVENTION

Figure 5:
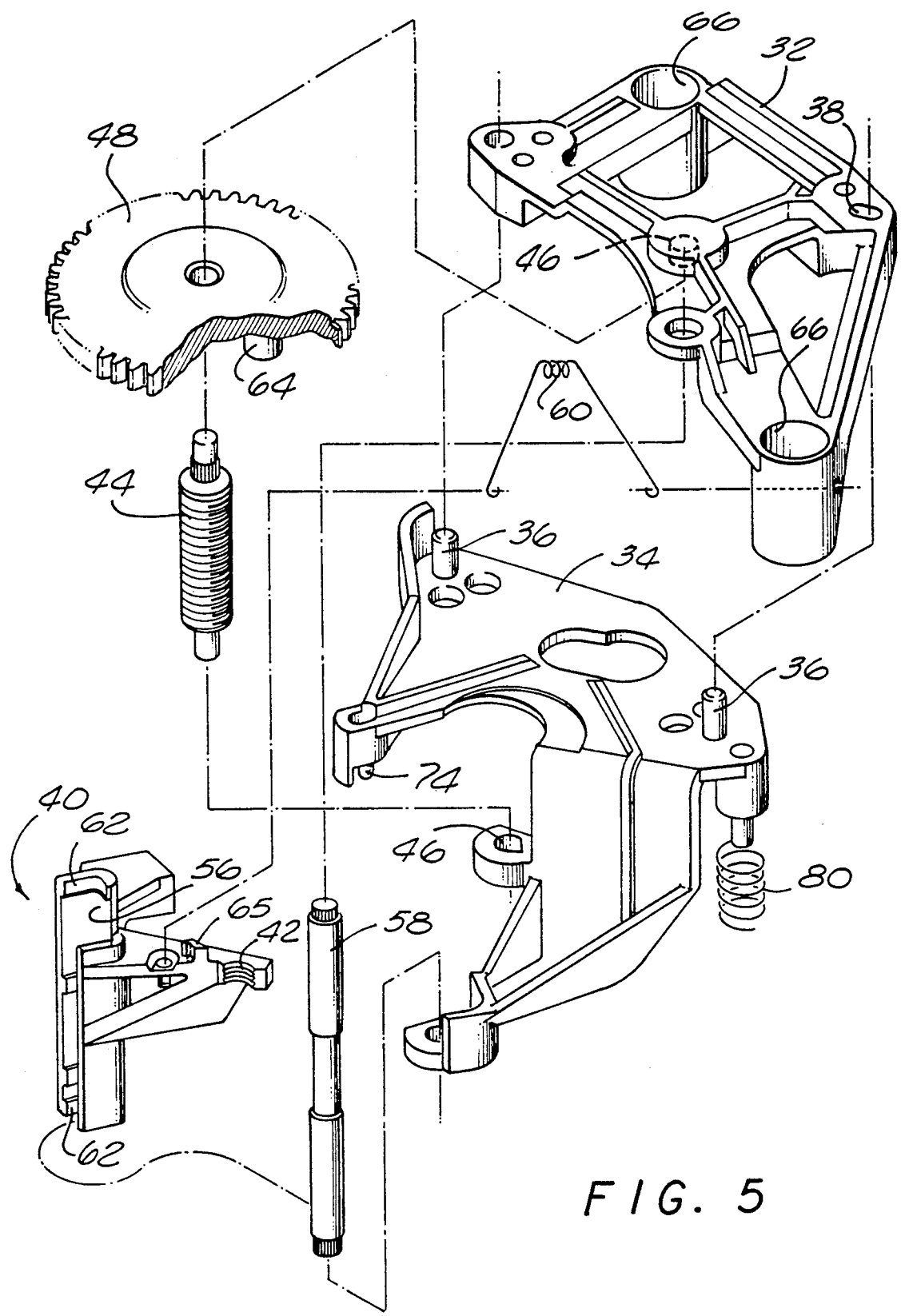
FIG. 5 is an exploded view of the head subassembly of FIG. 4.

To obtain a greater appreciation of the present invention a brief discussion will be given addressing the problems associated with installing a tape head in a tape drive. FIG. 1 shows a tape 10 passing before a tape head 12 that has a sensor 14 which reads the magnetic code on the tape 10. It is industry standard to have the sensor 14 completely perpendicular to the length of the tape 10, so that the head reads one segment of the tape at a time. Providing all tape heads with the same orientation with respect to the tape, allows a tape to be recorded in one tape recorder and played in another. If the second tape drive has a head sensor oriented as shown in phantom in FIG. 1, then the sensor will read several segments of the tape at once producing a distorted output. Likewise as shown in FIGS. 2 and 2a, the head must be essentially parallel to the tape along the vertical axis. The head typically protrudes slightly into the tape to insure that the tape head is sensing the tape. If the tape head and tape are not parallel, then the tape head will exert a moment on the tape, which will cause the tape to move relative to the tape head along the vertical axis. The accuracy required is quite high, with perpendicularity and parallelism between the head and tape typically being $0 \pm 0.2°$.

FIG. 3 shows a tape drive 16 of the present invention. The tape drive is oriented in a x, y and z coordinate system to better describe the invention. The tape drive 16 has a head subassembly 18 that is mounted to a baseplate 20. The baseplate 20 has a pair of guide walls 22 that guide a tape cartridge 24 into the drive 16. Within the baseplate 20 and below the edges of the cartridge 24, are a pair of rollers 26 that each exert an upward force on the cartridge 24, securing the tape 24 into a predetermined position. The rollers 26 are attached to springs (not shown) so that the tape 24 can be easily inserted and extracted from the tape drive 16.

As more clearly shown in FIGS. 4 and 5, the head subassembly 18 has a housing 30 that includes a top subframe 32 and a bottom subframe 34. The subframes are connected by dowels 36 in the bottom subframe 34 that extend through slots 38 in the top subframe 32. The slots 38 allow for manufacturing tolerances between the subframes. The subassembly 18 also has a head carrier 40 that houses the tape head 12. The carrier 40 has a threaded arm 42 that follows a lead screw 44. The threaded arm 42 preferably extends around the lead screw less than 180 degrees so that the carrier 40 can be easily disengaged from the screw 44. The lead screw 44 is supported at both ends by sockets 46 within the top and bottom subframes. The lead screw 44 is attached to a first gear 48, which is coupled to a second gear 50 that is attached to the output shaft 52 of a stepping motor 54. The stepping motor 54 rotates the gears and lead screw 44, causing the head carrier 40 and tape head 12 to move along the z axis.

The carrier 40 also has a sleeve 56 that follows a guide pin 58 rigidly attached at both ends to the subframes. As shown in FIG. 6, a torsional spring 60 is attached to the top subframe 32 and to the head carrier 40, to pull the threaded arm 42 and sleeve 56 into tight engagement with the lead screw 44 and guide pin 58, respectively. Although a torsional spring is shown, other types of springs and spring arrangements may be employed. The sleeve 56 is shaped as a C which has an outer groove width that is slightly smaller than the diameter of the guide pin 58, so that the sleeve 56 may be snapped onto the pin 58. This arrangement greatly improves the repairability of the tape drive 16 over previous devices, where the guide pin would have to be disassembled to remove the tape head. As shown in FIGS. 6, 8 and 9, the sleeve 56 has two radial corners 62 that abut against the guide pin 58. The pin 58 is pressed into the radial corner 62 by the spring 60, such that the carrier 40 cannot move in either the x or y axis. The sockets 46 have V shape portions such that the ends of the lead screw 44 are pressed into the center of the V. The V shaped sockets 46 and radial corners 62 prevent the tape head 12 from moving in either the x or y axis while the motor 54 is translating the head 12 along the z axis, while still allowing for tolerances in the manufacture and assembly of the tape drive 16. The corners and sockets 46 also prevent the head from floating, so that the head sensor 14 remains perpendicular to the length of the tape 10.

As more clearly shown in FIG. 5, the second gear 50 has a stop 64 on the bottom surface that can engage a thread stop 65 located on the carrier 40. The stops 64 and 65 prevent any further rotation of the gear 48 or movement of the tape head 12, when the arm 42 reaches the top of the lead screw 44. As viewed from the direction indicated by the arrow in FIG. 4, the output shaft 52 of the stepper motor 54 turns in a clockwise manner such that the second gear 48 rotates counterclockwise. Rotating the second gear 48 in a counterclockwise direction causes the stop 64 to push the threaded arm 42 toward the direction of the spring force. This insures that the carrier 40 is always contiguous with the guide pin 58 and lead screw 44, so that the tape head 12 does not move when the carrier 40 is stopped.

Figure 7:
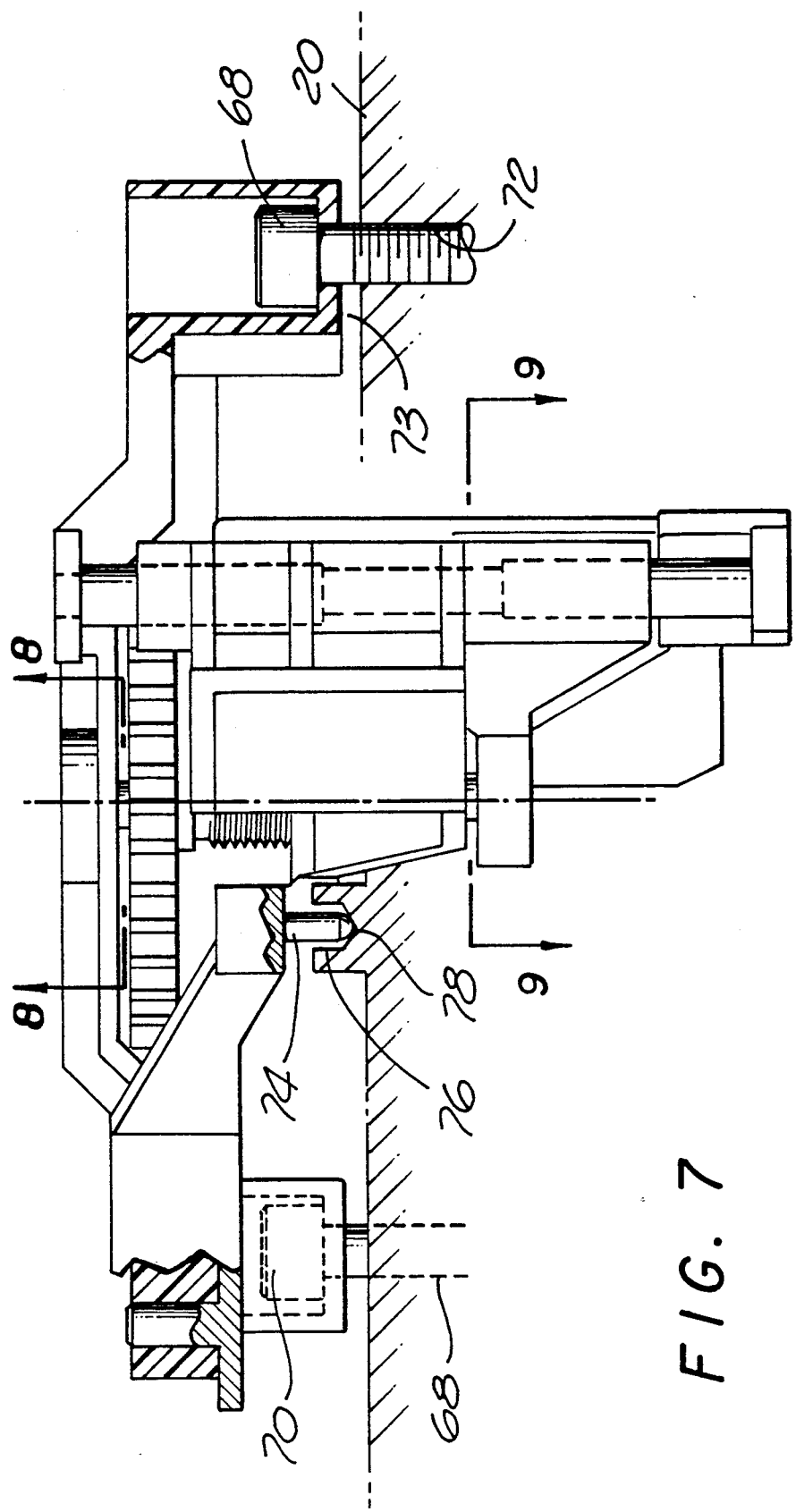
FIG. 7 is a cross-sectional view of FIG. 3, showing the subassembly mounted to the baseplate of the tape drive.

As shown in FIG. 7, the top subframe 32 has two cavities 66 constructed to retain a first 68 and a second 70 adjustment screw, that extend through the housing 30 and screw into a pair of threaded holes 72 in the baseplate 20. There is typically a gap 73 between the housing 30 and the baseplate, so that the housing 30 may move closer or farther away from the baseplate 20. The bottom subframe 34 has a dowel 74 with a rounded end that fits within a socket 76 formed in the baseplate 20.

The dowel 74 and socket 76 form a pivot point 78 to allow the housing 30 to pivot relative to the baseplate 20. The position of the tape head 12 is thereby adjusted by turning the screws 68 and 70, which rotate the housing 30 about the pivoting dowel 74 and socket 76. A compression spring 80 is attached to the top subframe 32 to bias the housing 30 away from the baseplate 20. The spring 80 keeps the tape head 12 in position while the head 12 is adjusted. The screws, spring and head are each located such that the outline of the four members forms a parallelogram. With this arrangement, turning the first screw 68 rotates the housing 30 about the y axis, such that the head sensor 16 is adjusted to be perpendicular to the length of the tape. Turning the second screw 70 rotates the housing 30 about the x axis, so that the head 12 is adjusted to be parallel with the tape 10. The screws each rotate the head 12 in only one plane, so that the parallelism or perpendicularity of the head can be adjusted by turning one of the screws. That is, to make the head sensor 14 perpendicular to the tape, only the first screw 68 need be turned, wherein the adjustment of the first screw 68 has no effect on the parallel alignment of the head 12 and tape. Likewise the turning of the second screw 70 adjust the parallelism of the head 12, without effecting the perpendicularity of the tape 10 and sensor 14.

The distance between the screws and the pivot point 78 is much greater than the distance from the pivot point 78 to the head 12, such that a large movement of the screws creates a small movement of the head. This allows a larger screw to be used to adjust the head position, which together with the remote location of the screws allows the operator to easily adjust the head during assembly. It is preferable to use screws turned at 40 threads per inch to provide a fine adjustment of the head 12. To assemble the tape drive 16, the head subassembly 18 is assembled as a unit, with the head 12, guide pin 58, gears 48 and 50 and the stepping motor 54 all attached. The spring 80 is attached and the subassembly 18 is then mounted to the baseplate 20 by the screws 68 and 70. An installment tape is then inserted and played and the first screw 68 is turned until the head sensor 14 is properly aligned with the tape 10. The installment tape is then removed and a gauge is attached to the baseplate 20. The gauge has two dial indicators that touch the ends of the head 12, whereby the second screw 70 is turned until the head 12 is in the proper position. A sealant is then applied to the screws to insure that the head no longer moves during usage.

While certain exemplary embodiments have been described in detail and shown in the accompanying drawings, it is to be understood that such embodiments are merely illustrative of, and not restrictive on the broad invention, and that this invention not be limited to the specific constructions and arrangements shown and described, since various other modifications may occur to those skilled in the art.

What is claimed is:

1. A tape drive that records and plays a tape, the tape drive being oriented within an orthogonal x, y and z coordinate system, comprising:
    a baseplate adapted to support the tape;
    a housing operatively connected to said baseplate having a pivot member that allows said housing to pivot about said baseplate;
    adjustment spring means operatively connected to said housing for biasing said housing relative to said baseplate;
    a tape head operatively connected to said housing;
    first adjustment means operatively connected to said housing for rotating said tape head relative to said baseplate about the y axis; and,
    second adjustment means operatively connected to said housing for rotating said tape head relative to said baseplate about the x axis.

2. The tape drive as recited claim 1, wherein said first and second adjustment means each include an adjustment screw that attaches said housing to said baseplate, wherein said housing is rotated by turning said adjustment screws.

3. The tape drive as recited in claim 2, wherein said adjustment screws have 40 threads per inch.

4. The tape drive as recited in claim 1, wherein said adjustment spring means is a linear spring in compression.

5. The tape drive as recited in claim 1, wherein said pivot member is a dowel with a rounded end that fits within a socket in said baseplate such that said dowel can rotate within said socket about the x, y and z axis.

6. The tape drive as recited in claim 1, further comprising;
    a stepping motor with an output shaft;
    a lead screw coupled to said output shaft and supported by said housing;
    a guide pin operatively connected to said housing;
    a head carrier that houses said tape head and is operatively connected to said guide pin, said head carrier having a threaded arm adapted to engage said lead screw such that rotation of said output shaft and said lead screw causes said head carrier and said tape head to move along the z axis; and,
    carrier spring means connected to said housing and said head carrier for biasing said head carrier into engagement with said lead screw.

7. The tape drive as recited in claim 6, wherein said head carrier is operatively connected to said guide pin with a C shaped sleeve adapted to snap onto said guide pin.

8. The tape drive as recited in claim 7, wherein said C shaped sleeve has at least two rounded corners that engage said guide pin, such that said carrier spring means biases said head carrier so that said guide pin is nested in one of said rounded corners, whereby said rounded corners prevent said head carrier from moving along the x or y axis.

9. The tape drive as recited in claim 8, wherein both ends of said guide pin are secured by said housing.

10. The tape drive as recited in claim 6, wherein both ends of said lead screw are supported by said housing.

11. The tape drive as recited in claim 10, wherein said housing has a pair of V shaped sockets that hold said lead screw ends, such that said carrier spring means biases said lead screw so that said lead screw ends are in the center of said V shaped sockets, whereby said V shaped sockets prevent said lead screw from moving along said x and y axis.

12. The tape drive as recited in claim 6, wherein said threaded arm extends around said lead screw no greater than 180 degrees.

13. The tape drive as recited in claim 6, wherein said carrier spring means is a torsional spring.

14. The tape drive as recited in claim 6, wherein said lead screw rotates about the z axis in a counterclockwise direction, such that said head carrier translates along the Z-axis in a positive direction.

15. The tape drive as recited in claim 14, further comprising a first gear attached to said lead screw that is coupled to a second gear attached to said output shaft of said stepping motor.

16. The tape drive as recited in claim 15, wherein said threaded arm has a stop to prevent said second gear from rotating about the z axis.

17. The tape drive as recited in claim 1, wherein said adjustment spring means, first and second adjustment means and said tape head define a parallelogram.

18. The tape drive as recited in claim 1, further comprising a pair of rollers attached to said base plate to hold the tape in a predetermined position relative to said tape head.

19. A tape drive that records and plays a tape, the tape drive being oriented within an orthogonal x, y and z coordinate system, comprising:

a baseplate adapted to support the tape;

a housing operatively connected to said baseplate, said housing having a pair of V-shaped slots;

a stepping motor operatively connected to said baseplate, said housing having a pair of V-shaped slots, said stepping motor having an output shaft;

a lead screw coupled to said output shaft and having a pair of ends that supported by said V-shaped slots said housing;

a guide pin operatively connected to said housing;

a head carrier operatively connected to said guide pin by a C-shaped sleeve that has at least one rounded corner that engages said guide pin, said head carrier having a threaded arm adapted to engage said lead screw such that rotation of said output shaft and said lead screw causes said head carrier to move along the z axis;

carrier spring means connected to said housing and said head carrier for biasing said head carrier into engagement with said lead screw; and, a tape head attached to said head carrier;

whereby said rotation of said output shaft of said stepping motor moves said tape head relative to the tape along the z axis.

20. The tape drive as recited in claim 19, further comprising:

pivot means connected to said baseplate and said housing for allowing said housing to pivot about said baseplate;

adjustment spring means operatively connected to said housing for biasing said housing relative to said baseplate;

first adjustment means operatively connected to said housing for rotating said tape head relative to said baseplate about the y axis; and, second adjustment means operatively connected to said housing for rotating said tape head relative to said baseplate about the x axis.

21. The tape drive as recited claim 20, wherein said first and second adjustment means each include an adjustment screw that attaches said housing to said baseplate, wherein said housing is rotated by turning said adjustment screws.

22. The tape drive as recited in claim 21, wherein said pivot means includes a dowel extending from said housing, said dowel having a rounded edge that fits within a socket within said baseplate such that said dowel can rotate within said socket about the x, y and z axis.

23. The tape drive as recited in claim 22, wherein said adjustment screws have 40 threads per inch.

24. The tape drive as recited in claim 23, wherein said adjustment spring means is a linear spring in compression.

25. The tape drive as recited in claim 20, wherein said threaded arm extends around said lead screw no greater than 180 degrees.

26. The tape drive as recited in claim 25, wherein said carrier spring means is a torsional spring.

27. The tape drive as recited in claim 20, wherein said lead screw rotates about the z axis in a counterclockwise direction, such that said head carrier translates along the Z-axis in a positive direction.

28. The tape drive as recited in claim 27, wherein said output shaft has a first gear that meshes with a second gear attached to said lead screw.

29. The tape drive as recited in claim 28, wherein said threaded arm has a stop to prevent said second gear from rotating about the z axis.

30. The tape drive as recited in claim 20, wherein said adjustment spring means, first and second adjustment means and said tape head define a parallelogram.

31. The tape drive as recited in claim 20, further comprising a pair of rollers attached to said baseplate to hold the tape in a predetermined position relative to said tape head.

32. A tape drive that records and plays a tape, the tape drive being oriented within an orthogonal x, y and z coordinate system, comprising:

a baseplate adapted to support the tape, said baseplate having a socket;

a housing operatively connected to said baseplate, said housing having a dowel with a rounded end that fits within said baseplate socket such that said housing can pivot about said baseplate;

a spring operatively connected to said housing for biasing said housing away from said baseplate;

a first adjustment screw that attaches said housing to said baseplate, wherein said housing is rotated relative to said baseplate about the y axis when said first adjustment screw is turned;

a second adjustment screw that attaches said housing to said baseplate, wherein said housing is rotated relative to said baseplate about the x axis when said second adjustment screw is turned;

a lead screw having both ends supported by V shaped sockets in said housing;

a guide pin having both ends connected to said housing;

a head carrier operatively connected to said guide pin by a C shaped sleeve that has at least one rounded corner that engages said guide pin, said head carrier has a threaded arm that follows said lead screw and moves said head carrier along the z axis when said lead screw is rotated;

a carrier spring connected to said housing and said head carrier that biases said head carrier into engagement with said lead screw and said guide pin, such that said lead screw is within the center of said V shaped sockets and said guide pin is nested in said rounded corner;

a tape head attached to said head carrier; and, a stepping motor with an output shaft coupled to said lead screw, adapted to rotate said lead screw;

whereby said rotation of said output shaft of said stepping motor moves said tape head relative to the tape along the z axis.

33. The tape drive as recited in claim 32, wherein said spring, first and second adjustment screws and said tape head define a parallelogram.

34. The tape drive as recited in claim 33, wherein said threaded arm extends around said lead screw no greater than 80 degrees.

35. The tape drive as recited in claim 34, wherein said carrier spring is a torsional spring.

36. The tape drive as recited in claim 35, wherein said lead screw rotates about the z axis in a counterclockwise direction, such that said head carrier translates along the Z-axis in a positive direction.

37. The tape drive as recited in claim 36, wherein said output shaft has a first gear that meshes with a second gear attached to said lead screw.

38. The tape drive as recited in claim 37, wherein said threaded arm has a stop to prevent said second gear from rotating about the z axis.

39. The tape drive as recited in claim 38, wherein said adjustment screws have 40 threads per inch.

40. The tape drive as recited in claim 39, further comprising a pair of rollers attached to said baseplate to hold the tape in a predetermined position relative to said tape head.

* * * * *